US008730378B2

(12) United States Patent
    Taguchi

(10) Patent No.: US 8,730,378 B2
(45) Date of Patent: May 20, 2014

(54) OPTICAL APPARATUS

(75) Inventor: Fumiya Taguchi, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/436,030

(22) Filed: Mar. 30, 2012

(65) Prior Publication Data

US 2012/0262623 A1    Oct. 18, 2012

(30) Foreign Application Priority Data

Apr. 6, 2011   (JP) ................................. 2011-084625

(51) Int. Cl.
    *H04N 5/232*      (2006.01)
    *G03B 13/24*      (2006.01)
(52) U.S. Cl.
    USPC .......................................... 348/346; 396/150
(58) Field of Classification Search
    USPC ............ 348/345, 362, 346, 348, 363, 208.15,
                   348/221.1; 396/102, 105, 107, 121, 150
    See application file for complete search history.

(56) References Cited

U.S. PATENT DOCUMENTS

| 6,750,914 | B2* | 6/2004 | Sannoh et al. ................ 348/346 |
| 7,209,175 | B1 | 4/2007 | Kurokawa et al. |
| 7,408,586 | B2* | 8/2008 | Ueda et al. .................... 348/372 |
| 7,469,098 | B2 | 12/2008 | Ito |
| 7,630,623 | B2 | 12/2009 | Ishii |
| 7,697,830 | B2 | 4/2010 | Ide et al. |
| 7,778,539 | B2 | 8/2010 | Ito |
| 7,783,185 | B2 | 8/2010 | Kusaka |
| 8,036,521 | B2* | 10/2011 | Ono et al. ..................... 396/104 |
| 8,373,792 | B2 | 2/2013 | Kurokawa et al. |
| 2002/0149689 | A1* | 10/2002 | Sannoh et al. ........... 348/333.02 |
| 2007/0279516 | A1 | 12/2007 | Ishii |
| 2008/0068490 | A1* | 3/2008 | Ueda et al. .................... 348/341 |
| 2010/0150538 | A1* | 6/2010 | Ono et al. ..................... 396/104 |

FOREIGN PATENT DOCUMENTS

| JP | A-6-205258 | 7/1994 |
| JP | 09-274129 | 10/1997 |
| JP | 2001-091819 | 4/2001 |
| JP | A-2002-311328 | 10/2002 |
| JP | 2003-302571 | 10/2003 |
| JP | 2004333828 A | * 11/2004 |
| JP | A-2004-333828 | 11/2004 |
| JP | A-2005-352163 | 12/2005 |

(Continued)

OTHER PUBLICATIONS

Apr. 16, 2013 Office Action issued in Japanese Patent Application No. 2011-084625 (with translation).

(Continued)

*Primary Examiner* — Ahmed A Berhan
(74) *Attorney, Agent, or Firm* — Oliff PLC

(57) ABSTRACT

An optical apparatus includes: a first focus detection unit that detects a focusing condition of an image forming optical system through a first focus detection method and outputs a first focus detection signal; a second focus detection unit that detects the focusing condition of the image forming optical system through a second focus detection method different from the first focus detection method and outputs a second focus detection signal; a focus adjustment unit that executes focus adjustment for the image forming optical system based upon either the first focus detection signal or the second focus detection signal; and a notification unit that alters a focus detection method notification in correspondence to the focus adjustment that the focus adjustment unit executes.

7 Claims, 9 Drawing Sheets

(56) References Cited

FOREIGN PATENT DOCUMENTS

| | | |
|---|---|---|
| JP | A-2006-053545 | 2/2006 |
| JP | A-2007-248782 | 9/2007 |
| JP | A-2007-279312 | 10/2007 |
| JP | 2007-316496 | 12/2007 |
| JP | 2007-316497 | 12/2007 |
| JP | A-2008-32963 | 2/2008 |

OTHER PUBLICATIONS

Sep. 4, 2013 Office Action issued in Japanese Patent Application No. 2011-084625 (with English Translation).

Sep. 10, 2013 Office Action issued in Japanese Patent Application No. 2011-084625 (with English Translation).

* cited by examiner

OPTICAL APPARATUS

INCORPORATION BY REFERENCE

The disclosure of the following priority application is herein incorporated by reference:
Japanese Patent Application No. 2011-084625 filed Apr. 6, 2011.

BACKGROUND OF THE INVENTION

1. Field of the Invention

The present invention relates to an optical apparatus equipped with a hybrid AF system that allows a switch-over between two different AF methods.

2. Description of Related Art

Japanese Laid Open Patent Publication No. 2002-311328 discloses an electronic camera equipped with a hybrid AF system featuring two AF methods (a phase difference detection AF method and a contrast detection AF method), through which autofocusing operation is executed. The electronic camera indicates to the user whether or not a focus match state has been achieved based upon AF results.

SUMMARY OF THE INVENTION

An optical apparatus equipped with a hybrid AF system that detects the state of focus adjustment through a plurality of autofocusing (AF) methods, such as phase difference detection and contrast detection, selects one of the plurality of AF methods in correspondence to the current conditions. For instance, when the optical apparatus needs to quickly focus on a moving subject, it switches to the phase difference detection AF method, whereas when a focus match state must be achieved with a high degree of accuracy, it switches to the contrast detection AF method. Various settings selected by the user for the optical apparatus are factors that affect the AF method switch-over.

However, the user is not notified of the specific AF method through which the optical apparatus is currently detecting the focusing condition. Thus, the user selecting settings for the optical apparatus may feel that the optical apparatus does not fully assure ease of use.

An object of the present invention, having been completed by addressing the issue discussed above, is provide a real-time notification of the AF method through which the focusing condition is currently being detected in an optical apparatus adopting two different AF methods.

According to the 1st aspect of the present invention, an optical apparatus comprises: a first focus detection unit that detects a focusing condition of an image forming optical system through a first focus detection method and outputs a first focus detection signal; a second focus detection unit that detects the focusing condition of the image forming optical system through a second focus detection method different from the first focus detection method and outputs a second focus detection signal; a focus adjustment unit that executes focus adjustment for the image forming optical system based upon either the first focus detection signal or the second focus detection signal; and a notification unit that alters a focus detection method notification in correspondence to the focus adjustment that the focus adjustment unit executes.

According to the 2nd aspect of the present invention, it is preferred that in the optical apparatus according to the 1st aspect, the notification unit provides a first notification when the focus adjustment unit executes the focus adjustment based upon the first focus detection signal and provides a second notification when the focus adjustment unit executes the focus adjustment based upon the second focus detection signal.

According to the 3rd aspect of the present invention, it is preferred that in the optical apparatus according to the 2nd aspect, the notification unit includes a display member and the second notification includes a reason why the focus adjustment cannot be executed based upon the first focus detection signal, displayed at the display member.

According to the 4th aspect of the present invention, it is preferred that in the optical apparatus according to the 3rd aspect, the first notification includes a reason why the focus adjustment cannot be executed based upon the second focus detection signal, displayed at the display member.

According to the 5th aspect of the present invention, it is preferred that in the optical apparatus according to the 1st aspect, the first focus detection unit includes a first light receiving element array and a second light receiving element array, each of which receives a pair of light fluxes having passed through different pupil areas of the image forming optical system, and a first signal output unit that outputs the first focus detection signal generated based upon a phase difference manifested by output signals provided from the first light receiving element array and the second light receiving element array; and the second focus detection unit includes a third light receiving element array, at which an optical image formed via the image forming optical system, undergoes photoelectric conversion, and a second signal output unit that outputs the second focus detection signal, which indicates contrast in the optical image based upon an output signal provided from the third light receiving element array.

According to the 6th aspect of the present invention, it is preferred that the optical apparatus according to the 1st aspect further comprises: an acquisition unit that obtains information regarding an aperture included in the image forming optical system, wherein: the focus adjustment unit includes a decision-making unit that makes a decision as to whether or not an aperture value set for the aperture, indicated in the information obtained via the acquisition unit, is lower than a predetermined value, executes focus adjustment based upon the first focus detection signal if the decision-making unit decides that the aperture value is lower than the predetermined value, and executes focus adjustment based upon the second focus detection signal if the decision-making unit decides that the aperture value is equal to or higher than the predetermined value; and the notification unit includes a display member that (1) provides, in a first area of the display member, a first display indicating that the focus adjustment is currently being executed for the image forming optical system based upon the first focus detection signal if the decision-making unit decides that the aperture value is lower than the predetermined value, and (2) provides, in a second area of the display member, a second display indicating that the focus adjustment is currently being executed for the image forming optical system based upon the second focus detection signal, and displays the aperture value in a third area of the display member set near the first area if the decision-making unit decides that the aperture value is equal to or higher than the predetermined value.

According to the 7th aspect of the present invention, it is preferred that in the optical apparatus according to the 1st aspect, the notification unit outputs a first sound when the focus adjustment unit is executing focus adjustment based upon the first focus detection signal and outputs a second sound different from the first sound when the focus adjustment unit is executing the focus adjustment based upon the second focus detection signal.

According to the 8th aspect of the present invention, it is preferred that in the optical apparatus according to the 1st aspect, the notification unit includes a light emitting member, emits light at the light emitting member in a first light emitting mode when the focus adjustment unit is executing the focus adjustment based upon the first focus detection signal, and emits light at the light emitting member in a second light emitting mode when the focus adjustment unit is executing focus adjustment based upon the second focus detection signal.

According to the 9th aspect of the present invention, it is preferred that the optical apparatus according to the 1st aspect further comprises: a viewing member at which a subject image to be captured is displayed, wherein: when the focus adjustment unit executes focus adjustment based upon the first focus detection signal, the notification unit further displays, at the viewing member, a first mark indicating a focus area currently being used by the first focus detection unit for focus detection, whereas when the focus adjustment unit is executing focus adjustment based upon the second focus detection signal, the notification unit further displays, at the viewing member, a second mark indicating a focus area currently being used by the second focus detection unit for focus detection.

According to the present invention, an optical apparatus adopting two AF methods is able to provide real-time notification of the AF method through which the focusing condition is currently being detected.

DESCRIPTION OF PREFERRED EMBODIMENT

Figure 1:
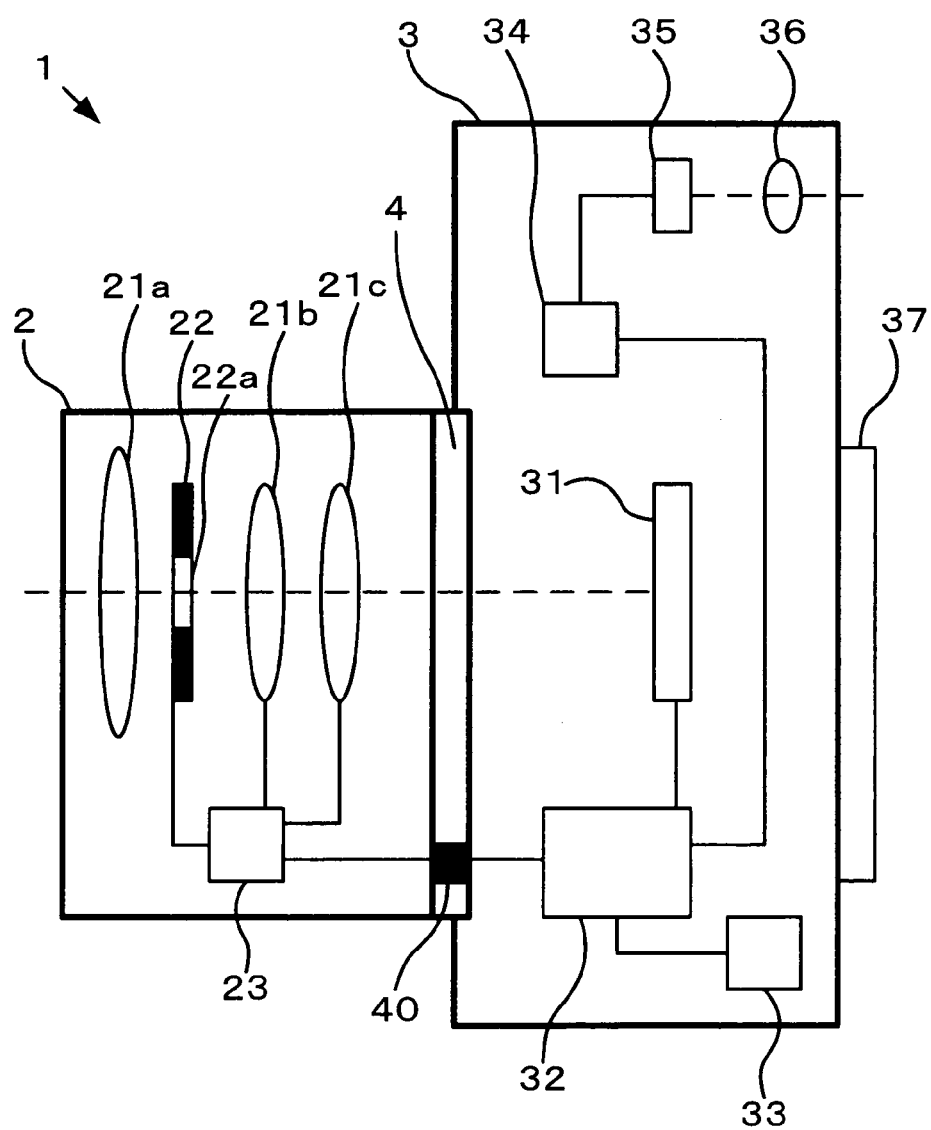
FIG. 1 is a block diagram showing the structure of a digital camera achieved as an embodiment of the optical apparatus according to the present invention.

FIG. 1 is a block diagram presenting an example of a structure that may be adopted in a digital camera equipped with a hybrid AF system, achieved as an embodiment of the optical apparatus according to the present invention. A digital camera 1 in FIG. 1 comprises an interchangeable lens 2 and a camera body 3, with the interchangeable lens 2 attached to a mount unit 4 at the camera body 3.

The interchangeable lens 2 includes lenses 21a through 21c, an aperture 22 and a lens drive control device 23. It is to be noted that the lens 21b and the lens 21c are respectively configured as a zooming lens and a focusing lens. The lens drive control device 23, which includes a CPU and its peripheral components, executes drive control for the lens 21c and the aperture 22, detects the positions of the lens 21b, the lens 21c and the aperture 22, and engages in communication with a control device at the camera body 3 so as to transmit lens information and receive camera information.

The amount of light transmitted through the interchangeable lens 2 can be adjusted by adjusting an opening 22a at the aperture 22. The size of the opening 22a at the aperture 22 can be adjusted by the user via an operation member, such as an aperture ring (not shown) disposed at the surface of the interchangeable lens 2, in a manual mode. The aperture ring is indexed in correspondence to various aperture values (F numbers). If a large aperture value is selected via the aperture ring, the size of the opening 22a is reduced and, as a result, the amount of subject light passing through the exchangeable lens 2 decreases. In addition, the size of the opening 22a at the aperture 22 is automatically determined in correspondence to the brightness of the subject when the camera is set in an auto mode.

The lens drive control device 23 detects the positions of the lens 21b, the lens 21c and the aperture 22, obtains lens information through arithmetic operation executed based upon the detected positions or selects the lens information corresponding to the detected positions from a lookup table prepared in advance, and provides the lens information to a camera drive control device 32. In addition, the lens drive control device 23 receives a focus detection signal transmitted from the camera drive control device 32, which will be described in detail later, and controls the drive of the focusing lens 21c based upon the focus detection signal thus received.

At the camera body 3, an image sensor 31, the camera drive control device 32, a memory card 33, an LCD driver 34, an LCD 35, an eyepiece lens 36, a display monitor 37 and the like are disposed. The image sensor 31, disposed at the predetermined imaging plane (predetermined focusing plane) of the interchangeable lens 2, captures a subject image formed via the interchangeable lens 2 and outputs imaging signals.

Light receiving elements disposed in a two-dimensional pattern at the image sensor 31 constitute light receiving element arrays. The light receiving element arrays include light receiving element arrays used for purposes of focus detection (hereafter referred to as focus detection arrays), each disposed at a position corresponding to a focus detection position. A focus detection array is constituted with a micro-lens and a pair of photoelectric conversion units. The micro-lens is disposed at the predetermined imaging plane of the interchangeable lens 2, with the pair of photoelectric conversion units disposed to the rear of the micro-lens. An image of the exit pupil of the interchangeable lens 2 is formed onto the pair of photoelectric conversion units. Thus, subject light beams having passed through different areas of the exit pupil of the interchangeable lens 2 and advancing toward the micro-lens are individually received at the two photoelectric conversion units and the light beams thus received then undergo photoelectric conversion at the photoelectric conversion units. Each of the pair of photoelectric conversion units transmits an output signal corresponding to the subject light beam having been received thereat and related to the subject image having passed through one of the two different areas of the exit pupil, to the camera drive control device 32.

The camera drive control device 32, which includes a CPU and its peripheral components, controls drive of the image sensor 31, processes a captured image, executes focus detection and focus adjustment for the interchangeable lens 2, controls the aperture 22, controls display at the LCD 35, engages in communication with the lens drive control device 23 and executes sequence control for the entire camera. The camera drive control device 32 engages in communication with the lens drive control device 23 via an electrical contact point 40 present at the mount unit 4.

Figure 8:
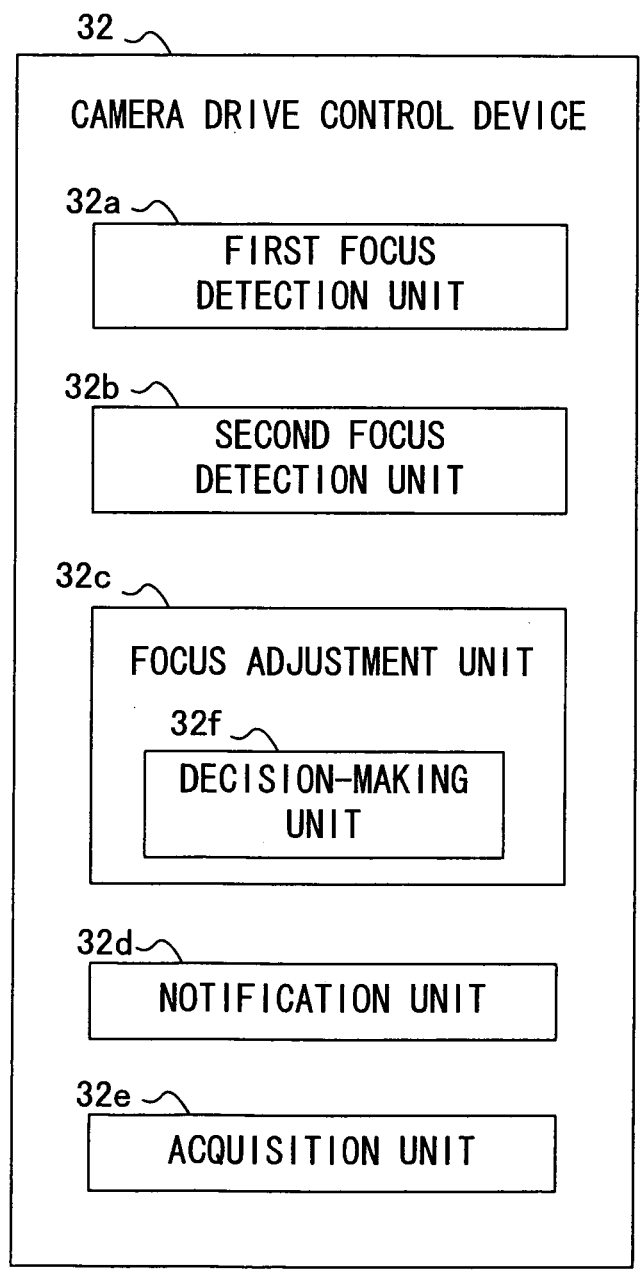
FIG. 8 is a block diagram indicating the functions of the camera drive control device achieved in the embodiment.

FIG. 8 is a functional block diagram pertaining to the camera drive control device 32. A first focus detection unit 32a, a second focus detection unit 32b, a focus adjustment unit 32c, a notification unit 32d and an acquisition unit 32e in FIG. 8 are functional units fulfilling the functions of the camera drive control device 32.

The first focus detection unit 32a calculates a defocus quantity indicating the extent of defocusing manifesting at a focus detection position, through arithmetic operation executed based upon a signal output from a focus detection array at the image sensor 31. The second focus detection unit 32b calculates an AF evaluation value based upon the high-frequency component in the imaging signals output from the image sensor 31. The notification unit 32d provides a focus detection method notification in correspondence to the type of focus adjustment executed by the focus adjustment unit 32c. The acquisition unit 32e obtains information related to the aperture 22, which may indicate, for instance, the aperture value, from the lens drive control device 23 via the electrical contact point 40. The focus adjustment unit 32c includes a decision-making unit 32f that makes a decision as to whether or not the aperture value having been obtained via the acquisition unit 32e is equal to or greater than a predetermined value. In correspondence to the results of the decision made by the decision-making unit 32f, the focus adjustment unit 32c transmits to the lens drive control device 23 either a phase difference detection AF focus detection signal generated based upon the defocus quantity calculated by the first focus detection unit 32a or a contrast AF focus detection signal generated based upon the AF evaluation value calculated by the second focus detection unit 32b. It is to be noted that the focus adjustment unit 32c, the notification unit 32d, the acquisition unit 32e and the decision-making unit 32f will be described in detail later.

The memory card 33 in FIG. 1 is used as an image storage area where captured images are stored. The LCD 35 is used as a display unit for a liquid crystal viewfinder (EVF; electronic viewfinder). The photographer is able to view the captured image displayed at the LCD 35 via the eyepiece lens 36. The camera drive control device 32 transmits image signals generated based upon outputs of the individual light receiving element arrays, to the LCD driver 34 and controls the LCD driver 34 so as to bring up the captured image on display at the LCD 35. In addition, the camera drive control device 32 stores the image signals into the memory card 33. The display monitor 37, which may be a liquid crystal display device, is disposed on the rear side of the camera body 3.

Figure 2:
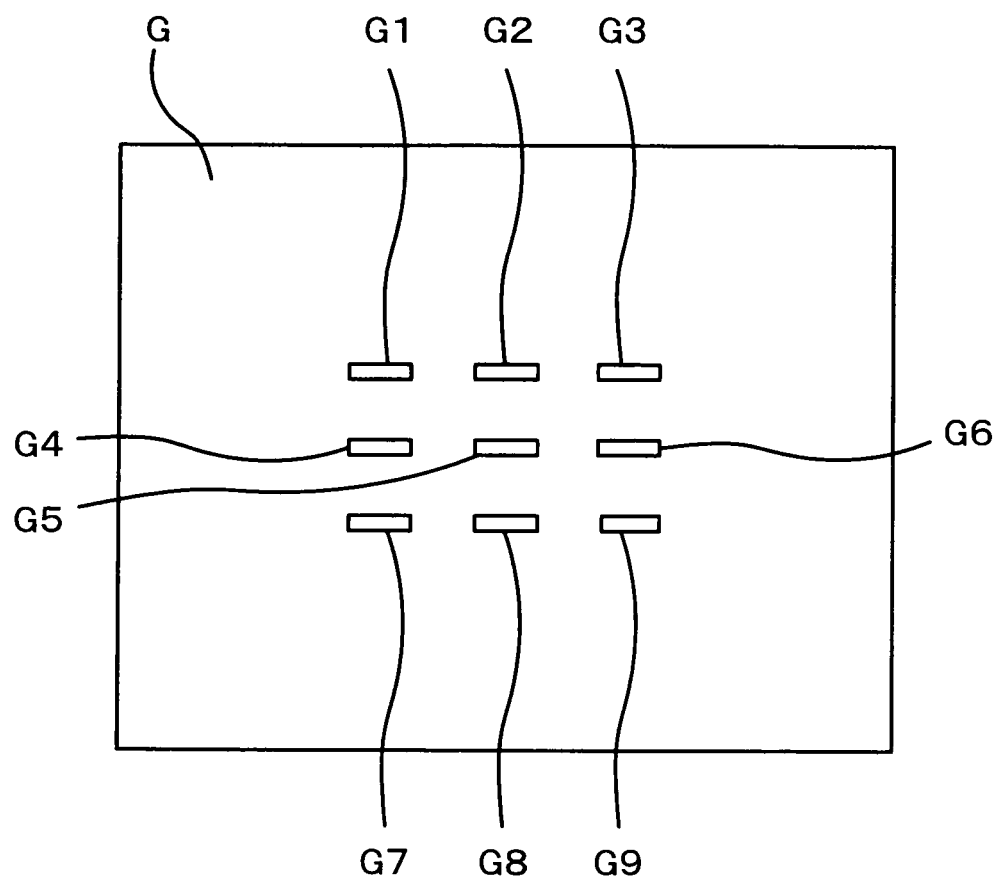
FIG. 2 shows focus detection areas present on an imaging plane set on a predetermined imaging plane of an interchangeable lens.

FIG. 2 shows focus detection areas on an imaging plane G set at the predetermined imaging plane of the interchangeable lens 2. Focus detection areas G1 through G9 are set on the imaging plane G. The focus detection arrays at the image sensor 31 take positions each corresponding to a specific focus detection area among the focus detection areas G1 through G9 set on the imaging plane G. Namely, images formed at the focus detection areas G1 through G9 in the subject image formed over the imaging plane G are sampled via the focus detection arrays at the image sensor 31.

Figure 3:
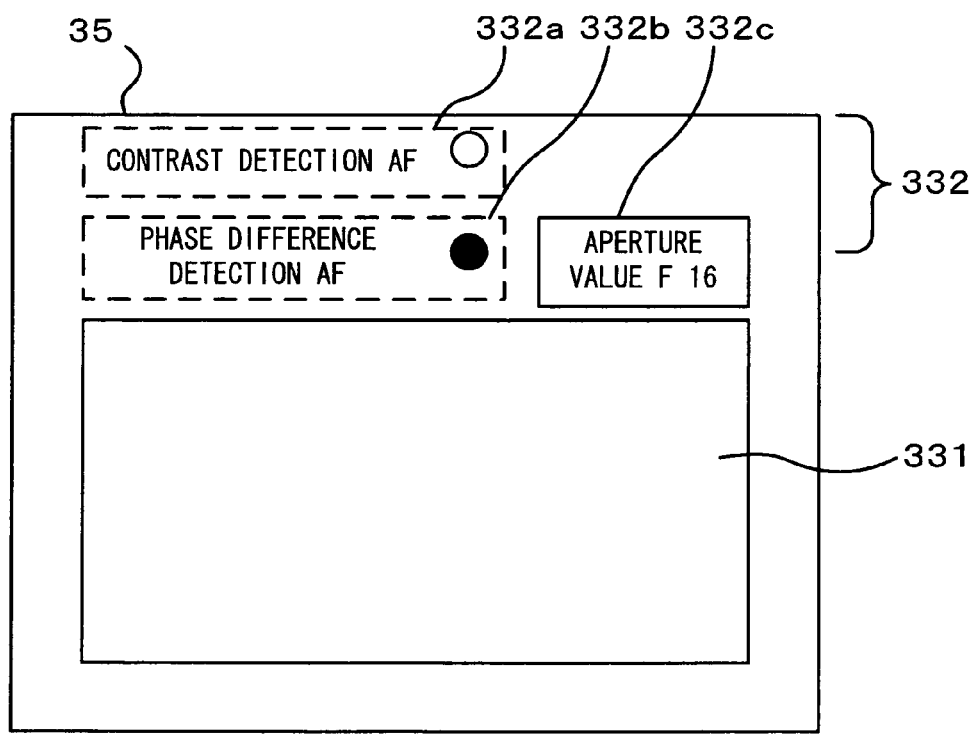
FIG. 3 presents an example of AF method notification provided via an LCD included in the digital camera.

FIG. 3 presents an example of a screen that may be brought up on display at the LCD 35. As FIG. 3 shows, the LCD 35 includes an image display area 331 where a captured image is displayed and a notification area 332 where information related to the current AF method through which the AF processing is being executed, is provided.

The notification area 332 is made up with a first display area 332a, a second display area 332b and a third display area 332c. The first display area 332a is used to indicate that the current AF method is the contrast detection AF method. The second display area 332b is used to indicate that the current AF method is the phase difference detection AF method. The third display area 332c is used to indicate why the focusing condition cannot be detected through the phase difference detection AF method.

In the first display area 332a, text, spelling out the name of the corresponding AF method, i.e., "contrast detection AF", is displayed and a lamp icon, which can be turned on or off under control executed via the notification unit 332d, is displayed. In the example presented in FIG. 3, the lamp icon in the first display area 332a is on, indicating that focus adjustment is currently being executed through the contrast detection AF method.

In the second display area 332b, text, spelling out the name of the corresponding AF method, i.e., "phase difference detection AF", is displayed and a lamp icon, which can be turned on or off under control executed via the notification unit 332d, is displayed. In the example presented in FIG. 3, the lamp icon in the second display area 332b is off, indicating that AF operation is not currently being executed through the phase difference detection AF method.

In the example presented in FIG. 3, "aperture no. F 16" is displayed in the third display area 332c set to the right of the second display area 332b, under control executed by the notification unit 32d. This display indicates that the aperture value selected at the interchangeable lens 2 is higher than a predetermined value (e.g., F 8) and thus, the focusing condition cannot be detected through phase difference detection AF operation.

The user, having read the display in the third display area 332c, is able to ascertain why the phase difference detection AF operation cannot be executed and alter the relevant setting at the digital camera 1 so as to engage the digital camera 1 in AF operation through the phase difference detection AF method. Upon deciding that the user has adjusted the setting at the digital camera 1 and thus has cleared the condition indicated in the third display area 332c that prohibits the phase difference AF operation, the camera drive control device 32 switches from the contrast detection AF method to the phase difference detection AF method so as to execute AF processing through the phase difference detection AF method. At this time, the notification unit 32e of the camera drive control device 32 turns off the lamp icon in the first display area 332a and turns on the lamp icon in the second display area 332b.

Figure 4:
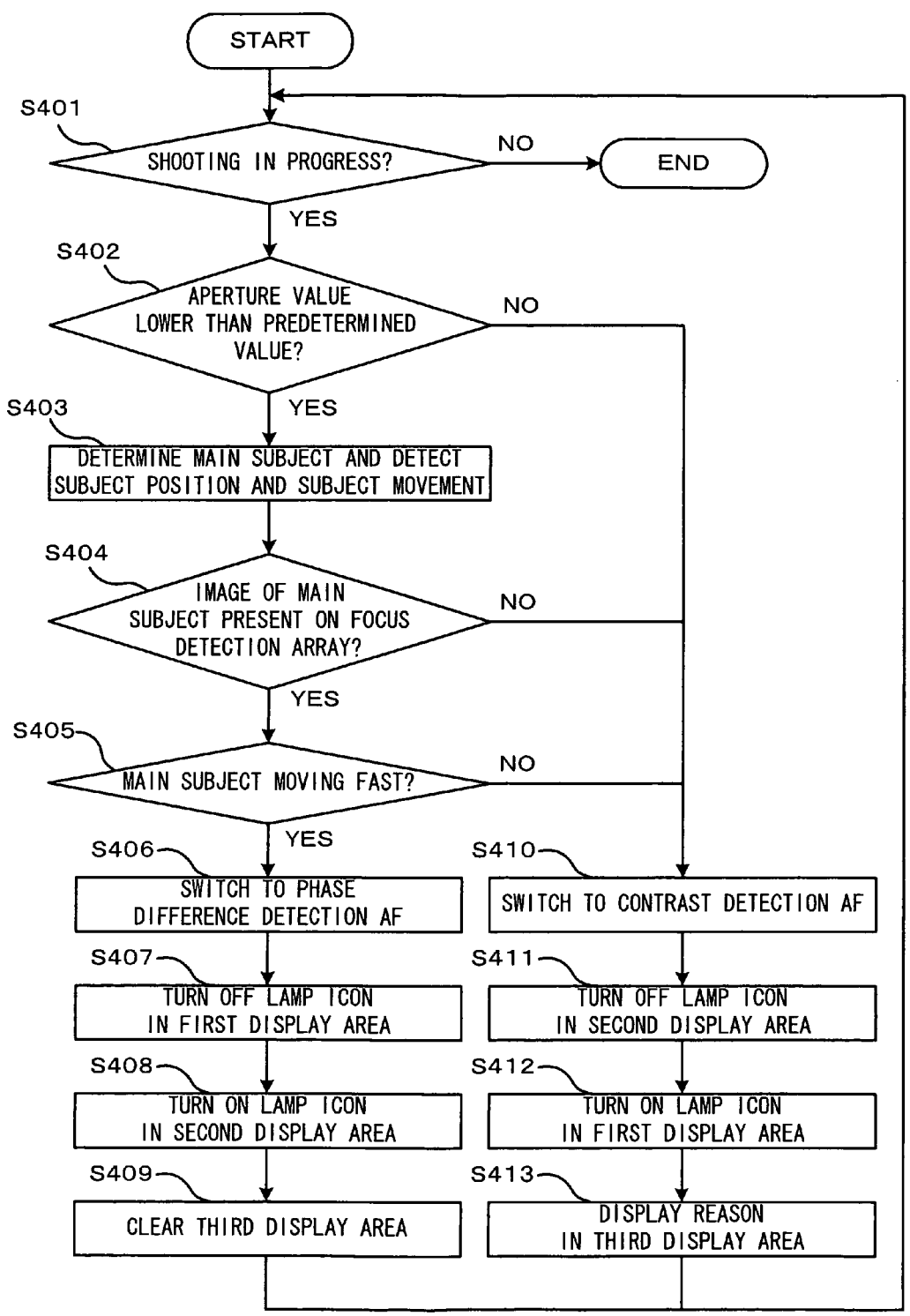
FIG. 4 presents a flowchart of an example of processing through which one of two AF methods is selected and a notification is provided in correspondence to the selected AF method.

FIG. 4 presents a flowchart of the AF method switch-over processing executed by the camera drive control device 32. A program enabling execution of the processing in the various steps in the flowchart presented in FIG. 4 is installed in a memory (not shown). The program is started up and executed by the camera drive control device 32. It is to be noted that the processing in the flowchart presented in FIG. 4 is executed while the user is shooting movie or the like. In step S401, the camera drive control device 32 makes a decision as to whether or not the movie shooting operation is still underway. If it is determined that the shooting operation is still underway, the camera drive control device 32 proceeds to execute the processing in step S402. However, it ends the processing in the flowchart presented in FIG. 4 if the shooting operation is no longer underway.

In step S402, the decision-making unit 32f makes a decision based upon the information pertaining to the aperture 22, which has been obtained via the acquisition unit 32e, as to whether or not the aperture value currently set for the interchangeable lens 2 is less than a predetermined value (e.g., F 8). If the decision-making unit 32f determines that the aperture value is less than the predetermined value (e.g., F 4<F 8), an affirmative decision is made in step S402, and the camera drive control device 32 proceeds to execute the processing in step S403. However, if the decision-making unit 32f determines that the aperture value is equal to or higher than the predetermined value, a negative decision is made in step S402, and the camera drive control device 32 proceeds to execute the processing in step S410.

In step S403, the camera drive control device 32 determines, based upon the imaging signals provided from the image sensor 31, an object to be designated as a main subject through image processing executed by adopting an image processing method of the known art or the like. It further detects the position of the main subject and any displacement of the main subject along the optical axis of the interchangeable lens 2.

In step S404, a decision is made as to whether or not the main subject, having been detected in step S403, is present on a focus detection array. If the main subject is determined to be present on a focus detection array, the camera drive control device 32 proceeds to execute the processing in step S405, whereas it proceeds to step S410 upon deciding that the main subject is not present on the focus detection array.

In step S405, the camera drive control device 32 makes a decision as to whether or not the main subject, having been detected in step S403, is currently moving at high speed along the optical axis of the interchangeable lens 2. Upon deciding that the main subject is moving fast along the optical axis of the interchangeable lens 2, the camera drive control device 32 proceeds to execute the processing in step S406, whereas it proceeds to execute the processing in step S410 upon deciding that the main subject is not moving at high speed along the optical axis of the interchangeable lens 2.

In step S406, the focus adjustment unit 32c switches to the phase difference detection AF method. In step S407, the notification unit 32d turns off the lamp icon in the first display area 332a. In step S408, the notification unit 32d turns on the lamp icon in the second display area 332b. In step S409, the notification unit 32d clears the information displayed in the third display area 332c. Upon ending the processing in step S409, the camera drive control device 32 returns to step S401.

In step S410, the focus adjustment unit 32c switches to the contrast detection AF method. In step S411, the notification unit 32d turns off the lamp icon in the second display area 332b. In step S412, the notification unit 32d turns on the lamp icon in the first display area 332a. In step S413, the notification unit 32d brings up on display in the third display area 332c, information indicating why the focusing condition cannot be detected through the phase difference detection AF method. For instance, the aperture value set for the interchangeable lens 2, having been determined in step S402 to be equal to or higher than the predetermined value, may be displayed in the third display area 332c by the notification unit 32d, as shown in FIG. 3. In addition, if it is decided in step S404 that the main subject is not present within a phase difference detection AF area 321, the notification unit 32d also displays in the third display area 332c display information indicating that the main subject is not present in a detection area 321.

The embodiment described above achieves the following advantages.

The focus adjustment unit 32c of the digital camera 1 achieved in the embodiment of the present invention adjusts the photographic lens 2 until it is driven to the focus match position by switching from the phase difference detection AF method to the contrast detection AF method or vice versa. While the focusing condition is being detected based upon an AF signal output from a focus detection array at the image sensor 31, the notification unit 32d sets the lamp icon in the first display area 332a in the OFF state (step S407 in FIG. 4), sets the lamp icon in the second display area 332b in the ON state (step S408) and does not display any information in the third display area 332c (step S409). While the focusing condition is being detected based upon imaging signals output from the light receiving element arrays at the image sensor 31 instead of the focus detection arrays at the image sensor 31, the notification unit 32d sets the lamp icon in the second display area 332b in the OFF state (step S411), sets the lamp icon in the first display area 332a in the ON state (step S412) and displays information indicating why the focusing condition cannot be detected through the phase difference detection AF method, in the third display area 332c (step S413). In other words, the notification unit 32d alters the notification so as to provide information corresponding to the current focusing condition detection method through which the focus adjustment unit 32c is executing the AF operation. Through these measures, the user of the optical apparatus adopting two different AF methods is provided with a real-time notification indicating the current focusing condition detection AF method.

The embodiment described above allows for the following variations.

The digital camera 1 achieved in the embodiment as described above is a "mirrorless-type" digital camera that does not have any mirror disposed between the interchangeable lens 2 and the image sensor 31. However, the present invention is not limited to this example and may be adopted in a single lens reflex camera equipped with a quick-return mirror. The quick-return mirror in such a single lens reflex camera adopting the present invention should be held in a retracted state during execution of the AF processing. In addition, the present invention may be adopted in an optical apparatus other than a digital camera. For instance, it may be adopted in binoculars with an auto focus function.

The digital camera 1 achieved in the embodiment as described above is equipped with a hybrid AF system featuring the contrast detection AF method and the phase difference detection AF method. However, the AF methods featured in the hybrid AF system adopted in the optical apparatus according to the present invention are not limited to the combination of the contrast detection AF method and the phase difference detection AF method. In other words, the present invention may be adopted in conjunction with a hybrid AF system that employs an active AF method achieved through the use of infrared light or ultrasound.

While lamp icons are displayed in the first display area 332a and the second display area of the LCD 35 in the example presented in FIG. 3, light emitting members such as LEDs may be turned on/off instead.

The means that allow the photographer to view the captured image is not limited to the eyepiece lens 36 and the LCD 35. For instance, the captured image may be viewed by the photographer via the display monitor 37 disposed at the rear surface of the camera body 3. In such a case, a screen such as that shown in FIG. 3 may be brought up on display at the display monitor 37 to inform the photographer of the current AF method.

The AF method notification may be provided in a display mode other than the display mode shown in FIG. 3. The alternative display modes include the following.

Alternative display mode (1): When the focusing condition cannot be detected through the phase difference detection AF method, information indicating why the focusing condition cannot be detected through the phase difference detection AF method is displayed in the third display area 332c in the embodiment described earlier. Another display area where information indicating why the focusing condition cannot be detected through the contrast detection AF method may also be set in the notification area 332. In this display area, a message "subject moving fast", for instance, may be displayed.

Figure 5:
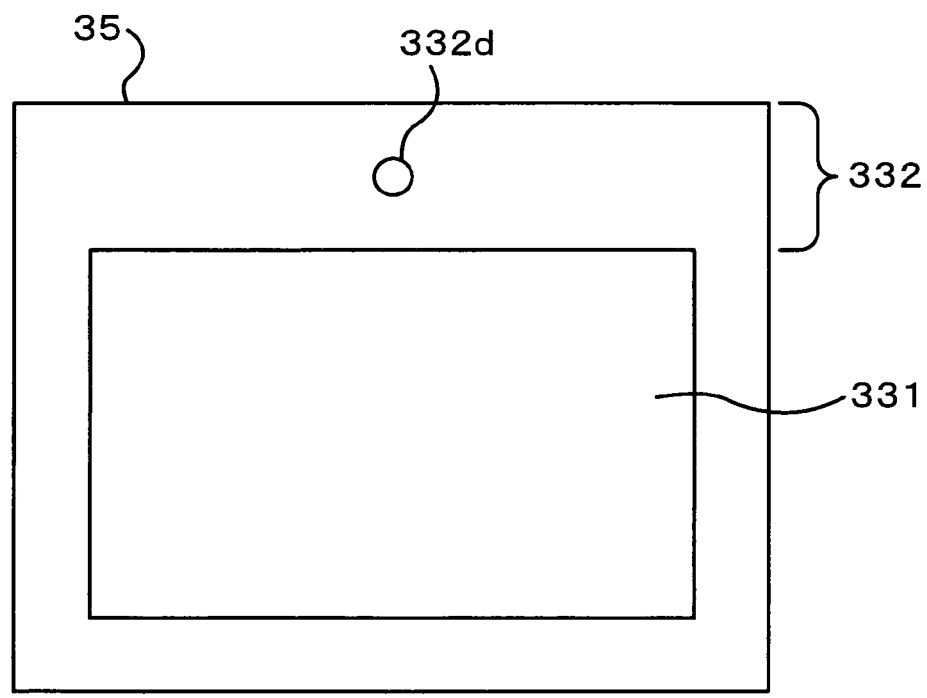
FIG. 5 shows a variation of AF method notification provided via the LCD.

Alternative display mode (2): The notification area 332 in the embodiment described earlier includes the first display area 332a used to indicate that the AF operation is currently being executed through the contrast detection AF method and the second display area 332b used to indicate that the AF operation is currently being executed through the phase difference detection AF method, as shown in FIG. 3. As an alternative, a lamp icon 332d, fulfilling the functions of both the first display area 332a and the second display area 332b, may be displayed as in the display example presented in FIG. 5. Such a lamp icon 332d may be turned on while the focusing condition is being detected through, for instance, the contrast detection AF method and turned on and off while the focusing condition is being detected through the phase difference detection AF method.

Figure 6:
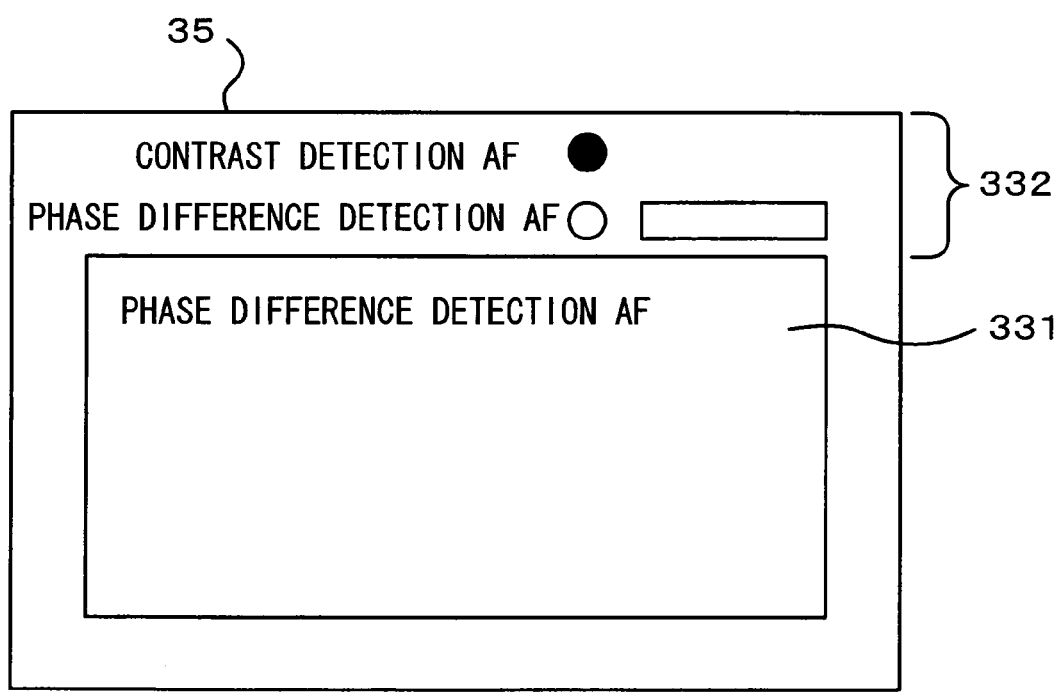
FIG. 6 shows a variation of AF method notification provided via the LCD.

Alternative display mode (3): The user may be notified of the current AF method via the image display area 331 as well as via the notification area 332. For instance, text spelling out the name of the current AF method "phase difference detection AF" may be displayed in the upper left corner of the image display area 331 at the LCD 35, as in the display example presented in FIG. 6.

Figure 7:
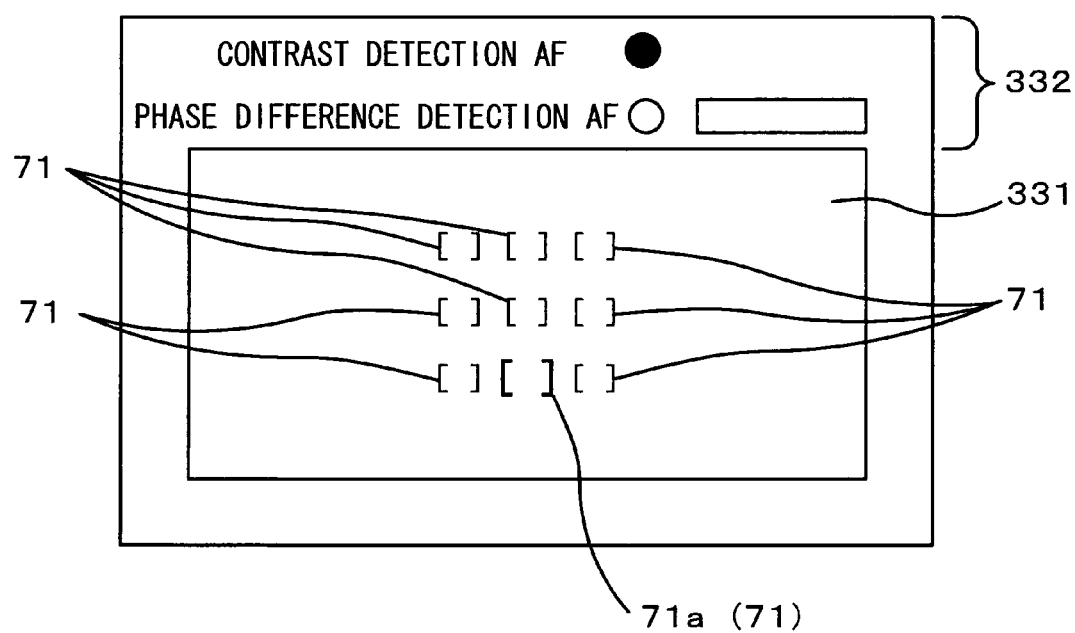
FIG. 7 shows a variation of AF method notification provided via the LCD.

In addition, the focus area currently being used for focus detection may be indicated in the image display area 331 at the LCD 35, and the notification unit 32d may provide a current AF method notification by assuming a specific display mode for the particular focus area, as shown in FIG. 7. In the display example presented in FIG. 7, nine marks 71 are displayed at positions corresponding to the positions of the focus detection arrays shown in FIG. 2. While the focusing condition is being detected through the phase difference detection AF method, the notification unit 32d displays the mark 71a corresponding to the focus area currently being used for focus detection by adopting a display mode different from the display mode for the remaining marks 71 (by using a different display color, by altering the size of the display symbol or the like).

Furthermore, while the focusing condition is being detected through the contrast detection AF method, the notification unit 32d may also display a mark corresponding to the focus area currently being used for focus detection in the image display area 331 at the LCD 35. In this case, upon seeing the focus areas indicated by the marks 71 displayed in the image display area 331 at the LCD 35, the user is able to ascertain that the focusing condition is being detected through the phase difference detection AF method, whereas the user, seeing the mark corresponding to the focus area move within the image display area 331 at the LCD 35 is able to determine that the focusing condition is currently being detected through the contrast detection AF method.

Figure 9:
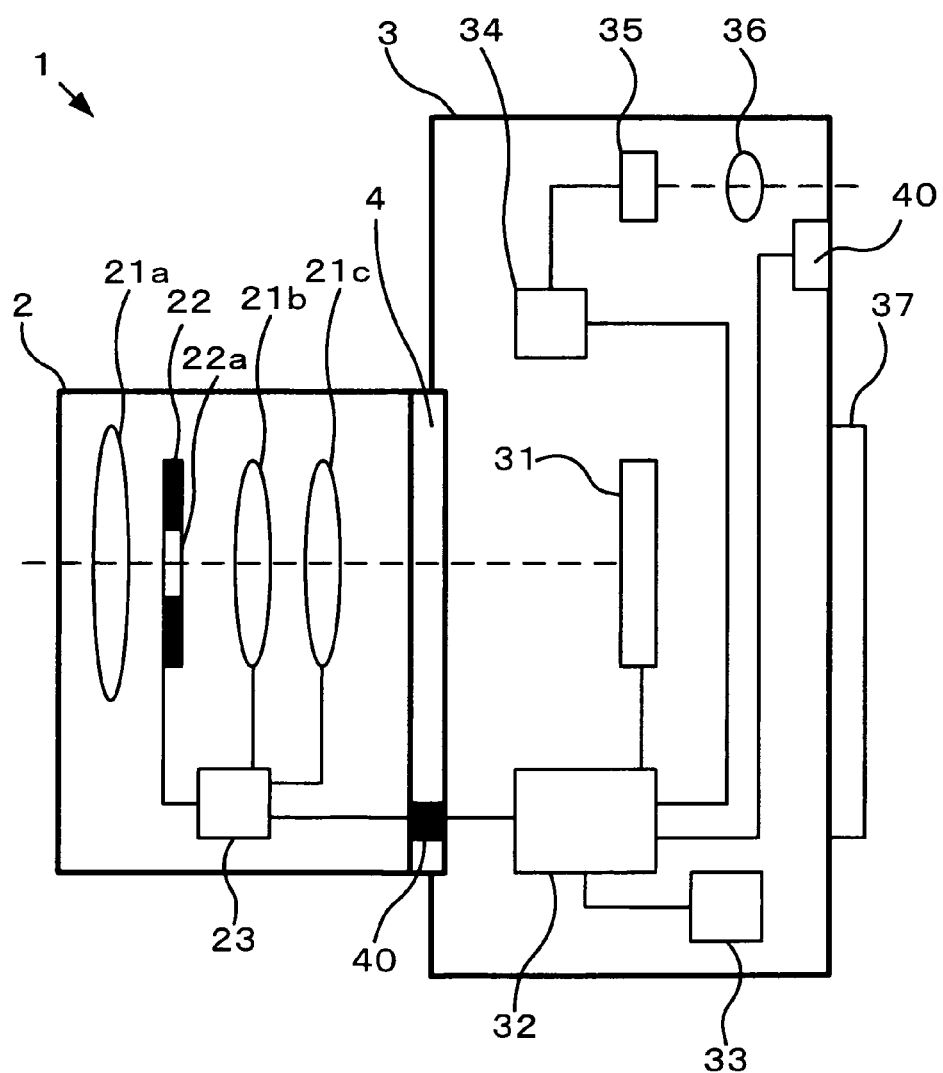
FIG. 9 is a block diagram showing the structure of a digital camera achieved in a variation.

Alternative display mode (4): Provided that the digital camera 1 is equipped with a speaker 40 capable of sound output, as shown in FIG. 9, an audio message corresponding to the current AF method may be output through the speaker 40. The audio message output through the speaker 40 may be, for instance, a buzzer sound. In addition, it is desirable that different sounds be output through the speaker 40 to indicate either that the focusing condition is currently being detected through the phase difference detection AF method or that the focusing condition is currently being detected through the contrast detection AF method. Furthermore, different sounds may be output through the speaker 40 to indicate that focusing condition detection is in progress and to indicate that a focus match state has been achieved.

Alternative display mode (5): Instead of displaying the text directly spelling out the names of the different focus detection methods, i.e., "contrast detection AF" and "phase difference detection AF" in the first display area 332a and the second display area 332b, as shown in FIG. 3, messages corresponding to the individual focus detection methods, e.g., messages indicating the characteristics or the like of the focus detection methods, may be displayed in the display areas. In such a case, a message such as "focusing enabled in any area", "no restriction on aperture value" or the like may be displayed in the first display area 332a, whereas a message "fast focusing possible in specific area" or the like may be displayed in the second display area 332b.

In the embodiment described earlier, the AF methods are switched while a movie shooting operation is in progress. However, the AF methods may be switched and a notification indicating the current AF method may be provided during, for instance, a still image capturing operation.

The above described embodiment is an example, and various modifications can be made without departing from the scope of the invention.

What is claimed is:

1. An optical apparatus comprising:
   a first focus detection unit that detects a focusing condition of an image forming optical system through a first focus detection method and outputs a first focus detection signal;
   a second focus detection unit that detects the focusing condition of the image forming optical system through a second focus detection method different from the first focus detection method and outputs a second focus detection signal;
   a focus adjustment unit that executes focus adjustment for the image forming optical system based upon either the first focus detection signal or the second focus detection signal; and
   a notification unit that includes a display member, and alters a focus detection method notification displayed at the display member in correspondence to the focus adjustment that the focus adjustment unit executes,
   wherein the notification unit provides a first notification when the focus adjustment unit executes the focus adjustment based upon the first focus detection signal and provides a second notification when the focus adjustment unit executes the focus adjustment based upon the second focus detection signal, the second notification including a reason why the focus adjustment cannot be executed based upon the first focus detection signal.

2. An optical apparatus according to claim 1, wherein:
   the first notification includes a reason why the focus adjustment cannot be executed based upon the second focus detection signal, displayed at the display member.

3. An optical apparatus according to claim 1, wherein:
   the first focus detection unit includes a first light receiving element array and a second light receiving element array, each of which receives a pair of light fluxes having passed through different pupil areas of the image forming optical system, and a first signal output unit that outputs the first focus detection signal generated based upon a phase difference manifested by output signals provided from the first light receiving element array and the second light receiving element array; and the second focus detection unit includes a third light receiving element array, at which an optical image formed via the image forming optical system, undergoes photoelectric conversion, and a second signal output unit that outputs the second focus detection signal, which indicates contrast in the optical image based upon an output signal provided from the third light receiving element array.

4. An optical apparatus according to claim 1, wherein:

the notification unit outputs a first sound when the focus adjustment unit is executing focus adjustment based upon the first focus detection signal and outputs a second sound different from the first sound when the focus adjustment unit is executing the focus adjustment based upon the second focus detection signal.

5. An optical apparatus according to claim 1, wherein:

the notification unit includes a light emitting member, emits light at the light emitting member in a first light emitting mode when the focus adjustment unit is executing the focus adjustment based upon the first focus detection signal, and emits light at the light emitting member in a second light emitting mode when the focus adjustment unit is executing focus adjustment based upon the second focus detection signal.

6. An optical apparatus according to claim 1, further comprising:

a viewing member at which a subject image to be captured is displayed, wherein:

when the focus adjustment unit executes focus adjustment based upon the first focus detection signal, the notification unit further displays, at the viewing member, a first mark indicating a focus area currently being used by the first focus detection unit for focus detection, whereas when the focus adjustment unit is executing focus adjustment based upon the second focus detection signal, the notification unit further displays, at the viewing member, a second mark indicating a focus area currently being used by the second focus detection unit for focus detection.

7. An optical apparatus comprising:

a first focus detection unit that detects a focusing condition of an image forming optical system through a first focus detection method and outputs a first focus detection signal;

a second focus detection unit that detects the focusing condition of the image forming optical system through a second focus detection method different from the first focus detection method and outputs a second focus detection signal;

a focus adjustment unit that executes focus adjustment for the image forming optical system based upon either the first focus detection signal or the second focus detection signal;

a notification unit that alters a focus detection method notification in correspondence to the focus adjustment that the focus adjustment unit executes; and an acquisition unit that obtains information regarding an aperture included in the image forming optical system, wherein:

the focus adjustment unit includes a decision-making unit that makes a decision as to whether or not an aperture value set for the aperture, indicated in the information obtained via the acquisition unit, is lower than a predetermined value, executes focus adjustment based upon the first focus detection signal if the decision-making unit decides that the aperture value is lower than the predetermined value, and executes focus adjustment based upon the second focus detection signal if the decision-making unit decides that the aperture value is equal to or higher than the predetermined value; and the notification unit includes a display member that (1) provides, in a first area of the display member, a first display indicating that the focus adjustment is currently being executed for the image forming optical system based upon the first focus detection signal if the decision-making unit decides that the aperture value is lower than the predetermined value, and (2) provides, in a second area of the display member, a second display indicating that the focus adjustment is currently being executed for the image forming optical system based upon the second focus detection signal, and displays the aperture value in a third area of the display member set near the first area if the decision-making unit decides that the aperture value is equal to or higher than the predetermined value.

* * * * *